June 17, 1941. R. J. PATTERSON 2,246,263
HANDLE FOR HAND IMPLEMENTS
Filed March 19, 1940
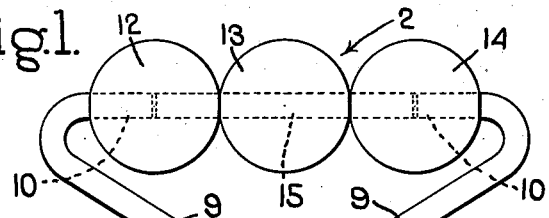
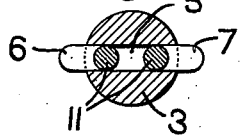
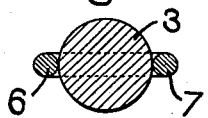
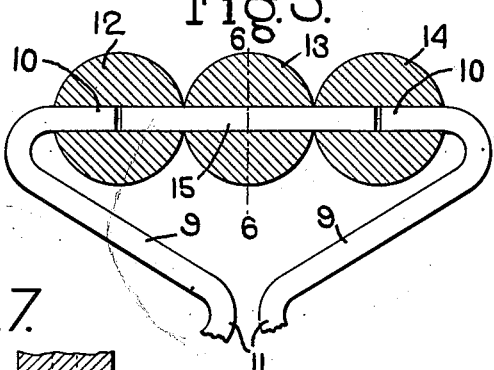
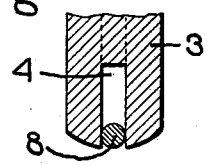
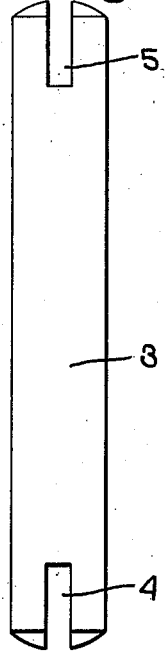
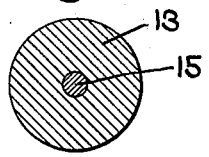
Inventor.
Ralph J. Patterson
by Heard Smith & Tennant
Attys.

Patented June 17, 1941

2,246,263

UNITED STATES PATENT OFFICE 2,246,263

HANDLE FOR HAND IMPLEMENTS

Ralph J. Patterson, Waterville, Maine

Application March 19, 1940, Serial No. 324,777

1 Claim. (Cl. 306—19)

This invention relates to hand implements of the type comprising a handle portion adapted to be grasped in the hand, and a rolling operating member rotatably carried by the handle portion.

Implements of this type are used for a great variety of purposes, and in order to give an understanding of the invention, I have illustrated it as it might be embodied in a hand massaging implement. I wish it to be understood, however, that certain features of the invention are equally applicable to various other hand implements of this type, such, for instance, as paper seam rollers used by paper hangers, or ink blotters, etc.

One of the objects of the invention is to provide a handle for an implement of this type which can be inexpensively manufactured and which does not involve the use of any screws, bolts, rivets or similar devices for securing together the various parts of the handle.

Other objects of the invention are to provide a handle which affords the operator a good grip and which can be used by the operator continuously without unduly tiring him.

Other objects of the invention are to improve generally handles for implements of this type in the particulars hereinafter set forth.

In the drawing, wherein I have illustrated a selected embodiment of my invention:

Fig. 1 is a plan view of a device embodying my invention.

Fig. 2 is a section on the line 2—2, Fig. 1.

Fig. 3 is a section on the line 3—3, Fig. 1.

Fig. 4 is a view of the body member of the handle portion.

Fig. 5 is a sectional view showing the operating member in section.

Fig. 6 is a section on the line 6—6, Fig. 5.

Fig. 7 is a section on the line 7—7, Fig. 1.

My improved implement is formed with the handle portion 1 adapted to be grasped in the hand, and the rolling operating member 2 which is rotatably carried by the handle 1. As stated above, this operating member may have various shapes and construction, depending upon the use to which the implement is to be put.

The handle portion of the implement comprises a body member 3 of wood, plastic or some other suitable material, and a wire frame member which is assembled with the body member 3 and which is formed at one end with a fork portion having trunnions that support the operating member 2. The body member 3 is preferably an elongated cylindrical body and it is formed at each end with a transverse slot, the slot at one end being indicated at 4 and that at the other end at 5. The wire frame member is made from a length of wire which is bent at its central portion to form the two parallel side members 6, 7 that are spaced apart a distance equal to the diameter of the body member 3. The bight portion 8 of the wire occupies the slot 4 in one end of the body member 3 and the two side portions 6 and 7 of the wire extending longitudinally of the body 3 on each side thereof and lie in contact therewith, as shown in Figs. 1 and 3.

The two ends of the wire member present the fork portion having the two arms 9 and the ends of the arms are bent inwardly toward each other, as shown at 10 to form trunnions on which the rolling operating member 2 is supported. Each side portion of the wire has the inbent portion 11 which extends into the slot 5 on the inner end of the body 3. This body 3 is, therefore, retained in position by the engagement of the bight 8 of the wire in the slot 4 and by the engagement of the inbent portions 11 of the wire in the slot 5.

The wire will preferably be sufficiently resilient so that the two sides thereof can be spread sufficiently to enable the body portion 3 to be assembled with the wire, as shown, and when the wire and the body are assembled, the resilience of the wire will hold the inbent portions 11 and the slot 5 with the side portions 6, 7 closely contacting the sides of the body member 3. The two parts of the handle, that is, the body member 3 and the wire portion, are thus held together without the use of any rivets, screws, bolts or other fastening means. A handle made in this way is very easy to grasp, and the continuous use of an implement embodying my invention will be less tiring to the operator than a handle made entirely of wire. The body portion 3 gives a sufficient size to the handle so that it can be readily held in the hand, and the presence of the side portions 6, 7 of the wire along opposite sides of the body 3 make it easy for the operator to hold the device correctly.

The operating member herein shown is for massaging purposes, and it comprises a plurality of rotatable ball-shaped members, three such members 12, 13 and 14 being shown herein. Each member is formed with an axial bore, and a center ball member 13 is mounted on a short shaft section 15 which extends diametrically therethrough, and the ends of which enter into the axial bores formed at the ball members 12 and 14. The trunnions 10 of the arms 9 also enter the outer end of the axial bores in the outer ball members 12 and 14. In this way the ball members are mounted for free rotation, but since the center ball member 13 is carried by a short shaft section, the ends of which are supported in the outer ball members 12 and 14, the operating member will have more or less flexibility which is highly desirable in massaging operations.

While I have illustrated a rotatable operating member designed for massaging purposes, yet so far as the handle feature is concerned, this operating member might have some other shape adapted for other purposes than massaging.

I claim:

A handle for a hand implement, said handle comprising an elongated cylindrical body member having a transverse slot at each end, the two slots being parallel, and a frame member of wire bent centrally to form two straight parallel side sections connected by a bight portion, said bight portion occupying the slot in the outer end of the body member and the two side sections extending longitudinally of the body member at either side thereof and in contact therewith from one end to the other, the wire frame extending beyond the inner end of the body member and the extended portion forming two diverging arms having bent ends to form trunnions to support a rotatable operating member, the portion of each side of the frame between the straight side section and the corresponding diverging arm being bent inwardly into the slot at the inner end of the body portion, said inwardly bent portions being spaced from and unattached to each other, the wire of which the frame is composed being sufficiently resilient to maintain the unattached inwardly bent portions in the slot with the straight sections engaging the sides of the body member.

RALPH J. PATTERSON.